(12) United States Patent
Williams et al.

(10) Patent No.: US 10,960,935 B2
(45) Date of Patent: Mar. 30, 2021

(54) TRUCK BED COVERS INCLUDING A COMPARTMENT FORMING PANEL

(71) Applicant: Toyota Motor Engineering & Manufacturing North America, Inc., Plano, TX (US)

(72) Inventors: Paxton S. Williams, Milan, MI (US); Randy Badia, Saline, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 78 days.

(21) Appl. No.: 16/262,536

(22) Filed: Jan. 30, 2019

(65) Prior Publication Data

US 2020/0239084 A1 Jul. 30, 2020

(51) Int. Cl.
| | | |
|---|---|---|
| *B62D 33/02* | (2006.01) | |
| *B60J 7/14* | (2006.01) | |
| *B60R 9/06* | (2006.01) | |
| *B60R 5/04* | (2006.01) | |
| *B60P 7/02* | (2006.01) | |

(52) U.S. Cl.
CPC .......... *B62D 33/0207* (2013.01); *B60J 7/141* (2013.01); *B60P 7/02* (2013.01); *B60R 5/045* (2013.01); *B60R 9/06* (2013.01); *B60R 9/065* (2013.01)

(58) Field of Classification Search
CPC .......... B62D 33/0207; B60P 7/02; B60P 7/14; B60R 9/06; B60R 9/065; B60R 5/045
USPC .............................. 296/37.6, 136.03, 100.09
See application file for complete search history.

(56) References Cited

U.S. PATENT DOCUMENTS

| | | | | |
|---|---|---|---|---|
| 4,313,636 A | * | 2/1982 | Deeds | B60J 7/141 160/93 |
| 4,824,162 A | * | 4/1989 | Geisler | B60J 7/041 16/269 |
| 4,917,429 A | * | 4/1990 | Giger | B60R 11/06 211/184 |
| 6,095,588 A | * | 8/2000 | Rodosta | B60J 7/141 296/100.09 |
| 6,183,035 B1 | * | 2/2001 | Rusu | B60J 7/1621 296/100.01 |
| 6,217,103 B1 | | 4/2001 | Schultz et al. | |
| 6,264,266 B1 | | 7/2001 | Rusu et al. | |

(Continued)

FOREIGN PATENT DOCUMENTS

GB 2466029 6/2013

OTHER PUBLICATIONS

Chevy truck stowe cargo Systems (https://stowecargo.com/product/chevy-truck-stowe-cargo-systems/).

*Primary Examiner* — Gregory A Blankenship
(74) *Attorney, Agent, or Firm* — Dinsmore & Shohl LLP

(57) ABSTRACT

A truck bed cover for a pickup truck includes a first panel assembly and a second panel assembly that is pivotally connected to the first panel assembly such that the second panel assembly pivots relative to the first panel assembly between a closed configuration and an open configuration providing an uncovered region adjacent the first panel assembly. The first panel assembly includes a panel having a cover configuration where the panel covers a part of a truck bed and a compartment configuration where a free end of the panel engages a floor of the truck bed to form part of a compartment beneath the truck bed cover.

8 Claims, 4 Drawing Sheets

(56) References Cited

U.S. PATENT DOCUMENTS

| | | | |
|---|---|---|---|
| 6,338,520 B2 * | 1/2002 | Rusu | B60J 7/1621 |
| | | | 248/231.51 |
| 6,536,826 B1 * | 3/2003 | Reed | B60P 3/42 |
| | | | 224/404 |
| 6,550,836 B2 | 4/2003 | Rigau | |
| 7,438,338 B1 * | 10/2008 | Schumacher | B60R 5/04 |
| | | | 222/404 |
| 9,802,548 B2 * | 10/2017 | Wilson | B60R 9/065 |
| 9,827,916 B1 | 11/2017 | Singer | |
| 10,059,180 B1 * | 8/2018 | Bosco | B62D 33/042 |
| 10,118,471 B1 * | 11/2018 | White | B60R 5/045 |
| 2001/0017474 A1 * | 8/2001 | Leitner | B60R 9/00 |
| | | | 296/37.6 |
| 2007/0018473 A1 * | 1/2007 | Alliger | B60R 5/045 |
| | | | 296/24.4 |
| 2009/0250962 A1 * | 10/2009 | Polewarczyk | B60P 7/14 |
| | | | 296/57.1 |
| 2010/0127529 A1 | 5/2010 | Elliott et al. | |
| 2011/0315725 A1 * | 12/2011 | Soldatelli | B60R 5/04 |
| | | | 224/42.32 |
| 2016/0167718 A1 * | 6/2016 | Wilson | B60R 5/045 |
| | | | 224/404 |
| 2017/0015254 A1 * | 1/2017 | Wilson | B60J 7/141 |
| 2017/0232907 A1 * | 8/2017 | Singer | B60R 9/065 |
| | | | 224/404 |
| 2017/0327052 A1 * | 11/2017 | Singer | B60P 7/14 |
| 2018/0086277 A1 * | 3/2018 | Wilson | B60R 9/065 |
| 2018/0345768 A1 * | 12/2018 | Frederick | B60J 7/141 |
| 2018/0361839 A1 * | 12/2018 | White | B60J 7/141 |
| 2019/0283684 A1 * | 9/2019 | Singer | B60J 7/1621 |

\* cited by examiner

TRUCK BED COVERS INCLUDING A COMPARTMENT FORMING PANEL

TECHNICAL FIELD

The present specification generally relates to truck bed covers and, more specifically, to truck bed covers including a compartment forming panel that is used to form a compartment beneath the truck bed covers.

BACKGROUND

Pickup trucks often have open top truck beds that are exposed to environmental conditions, such as rain, sun, etc. Truck bed covers, sometimes referred to as tonneau covers, are known that cover the truck beds and provide some barrier to the environment and some added security for items in the truck bed. Different types of truck bed covers are available. One such truck bed cover is a single-piece panel that is hingedly connected on a forward wall on the truck bed. Another type of truck bed cover is formed as a flexible substrate that can be rolled and unrolled to cover the truck bed. Yet another type of truck bed cover is formed of multiple panels that are hingedly connected to one another to fold and unfold between open and closed positions. While these multiple panel truck bed covers can be only partially opened by moving only one panel, they leave the truck bed again open to the environment. What is needed is a truck bed cover that can form enclosed compartments underneath the truck bed cover when the truck bed cover is only partially opened to isolate a portion of the truck bed from the environment and provide added security.

SUMMARY

In accordance with one embodiment, a truck bed cover for a pickup truck includes a first panel assembly and a second panel assembly that is pivotally connected to the first panel assembly such that the second panel assembly pivots relative to the first panel assembly between a closed configuration and an open configuration providing an uncovered region adjacent the first panel assembly. The first panel assembly includes a panel having a cover configuration where the panel covers a part of a truck bed and a compartment configuration where a free end of the panel engages a floor of the truck bed to form part of a compartment beneath the truck bed cover.

In another embodiment, a pickup truck includes a passenger cabin and a truck bed located rearward of the passenger cabin in a vehicle longitudinal direction. The truck bed includes a floor and a pair of spaced apart sidewalls. A truck bed cover is connected to the sidewalls. The truck bed cover includes a first panel assembly and a second panel assembly that is pivotally connected to the first panel assembly such that the second panel assembly pivots relative to the first panel assembly between a closed configuration and an open configuration providing an uncovered region adjacent the first panel assembly. The first panel assembly includes a panel having a cover configuration where the panel covers a part of the truck bed and a compartment configuration where a free end of the panel engages a floor of the truck bed to form part of a compartment beneath the truck bed cover.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Pickup trucks according to the present specification include a passenger cabin and a truck bed located rearward of the passenger cabin. A truck bed cover is sized to cover the truck bed and movably attaches to walls of the truck bed to allow the truck bed cover to be moved between open and closed configurations. The truck bed cover may be a multi-panel truck bed cover that includes multiple panel assemblies that are hingedly attached to one another to allow for folding and unfolding of one panel assembly relative to an adjacent panel assembly. In some embodiments, the panel assemblies include a cover panel and a compartment panel where the cover panel is used to cover the truck bed and the compartment panel is used to form a part of a compartment beneath the truck bed cover. In another embodiment, the cover panels, themselves may, in a cover configuration, form part of the truck bed cover and, in a compartment configuration, form part of a compartment beneath the truck bed cover.

Figure 1:
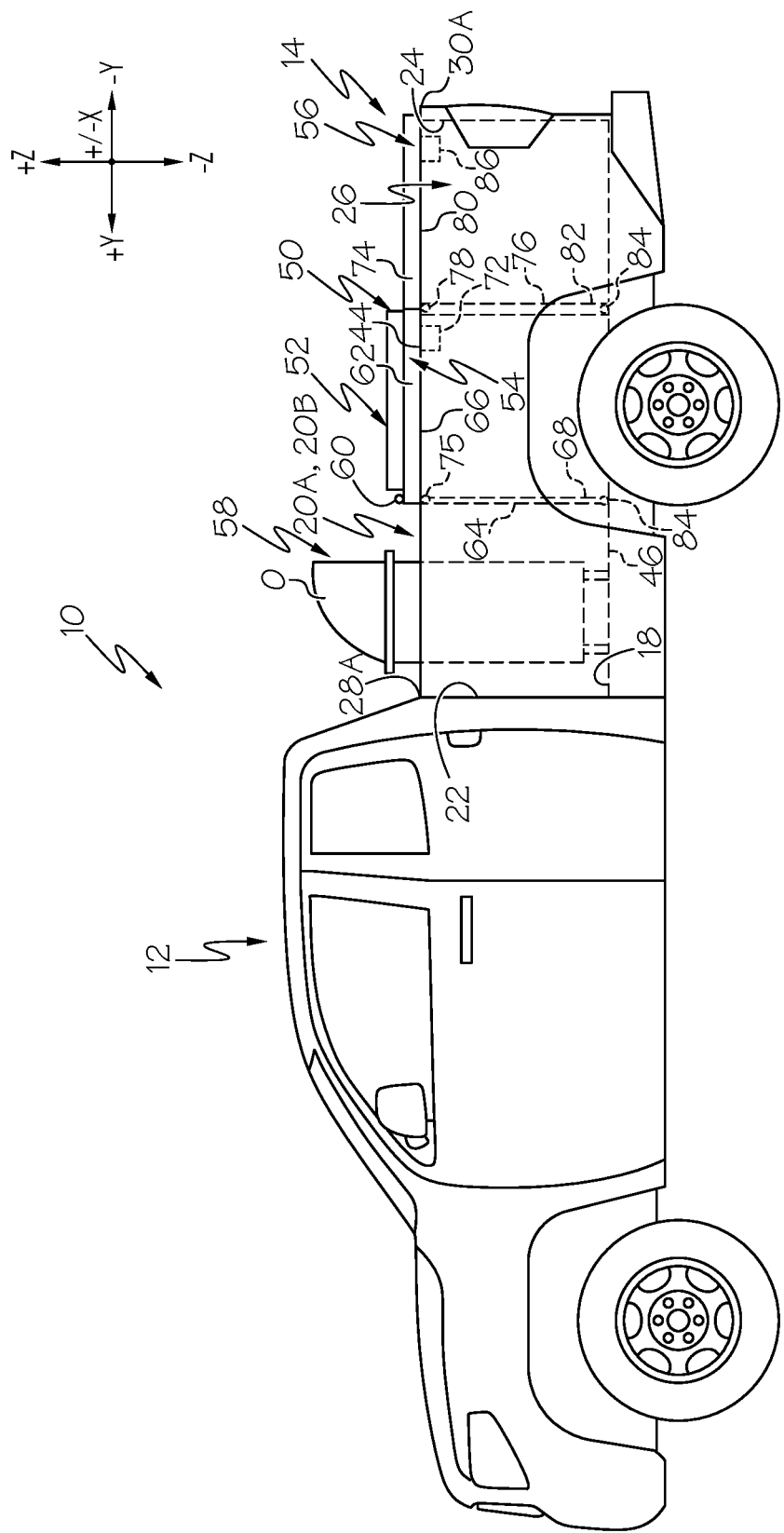
FIG. 1 schematically depicts a side view of a pickup truck having a truck bed with a truck bed cover, according to one or more embodiments shown and described herein.

As used herein, the term "vehicle longitudinal direction" refers to the forward-rearward direction of the pickup truck (i.e., in the +/− vehicle Y direction depicted in FIG. 1). The term "vehicle lateral direction" refers to the cross-pickup truck direction (i.e., in the +/− vehicle X direction depicted in FIG. 1), and is transverse to the vehicle longitudinal direction. The term "vehicle vertical direction" refers to the upward-downward direction of the pickup truck (i.e., in the +/− vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

Referring to FIG. 1, the terms "outboard" or "outward" as used herein refers to the relative location of a component in a direction with respect to a pickup truck centerline. The term "inboard" or "inward" as used herein refers to the relative location of a component in a direction with respect to the pickup truck centerline. Because the pickup truck structures may be generally symmetrical about the pickup truck centerline, the direction to which use of terms "inboard," "inward," "outboard" and "outward" refer may be mirrored about the pickup truck centerline when evaluating components positioned along opposite sides of the pickup truck 10.

Referring to FIG. 1, a pickup truck is generally illustrated at 10. The pickup truck 10 includes a passenger cabin 12 and a truck bed 14. The truck bed 14 includes a floor 18, a pair of spaced apart sidewalls 20A, 20B, a front wall 22, and a rear wall 24. The floor 18, the sidewalls 20A, 20B, the front wall 22, and the rear wall 24 define a storage area 26 of the truck bed 14.

The sidewalls 20A, 20B extend parallel to the vehicle longitudinal direction. Each sidewall 20A, 20B includes a front end 28A, 28B and an opposite rear end 30A, 30B. The front wall 22 extends between the front ends 28A, 28B of the sidewalls 20A, 20B. The rear wall 24 extends between the rear ends 30A, 30B of the sidewalls 20A, 20B.

In some embodiments, it is appreciated, that the rear wall 24 is pivotally connected to the sidewalls 20A, 20B as a tailgate for movement between a closed position and an open position. In the closed position, the rear wall 24 extends parallel to the vehicle vertical direction. In the open position, the rear wall 24 extends parallel to the vehicle longitudinal direction.

Figure 2:
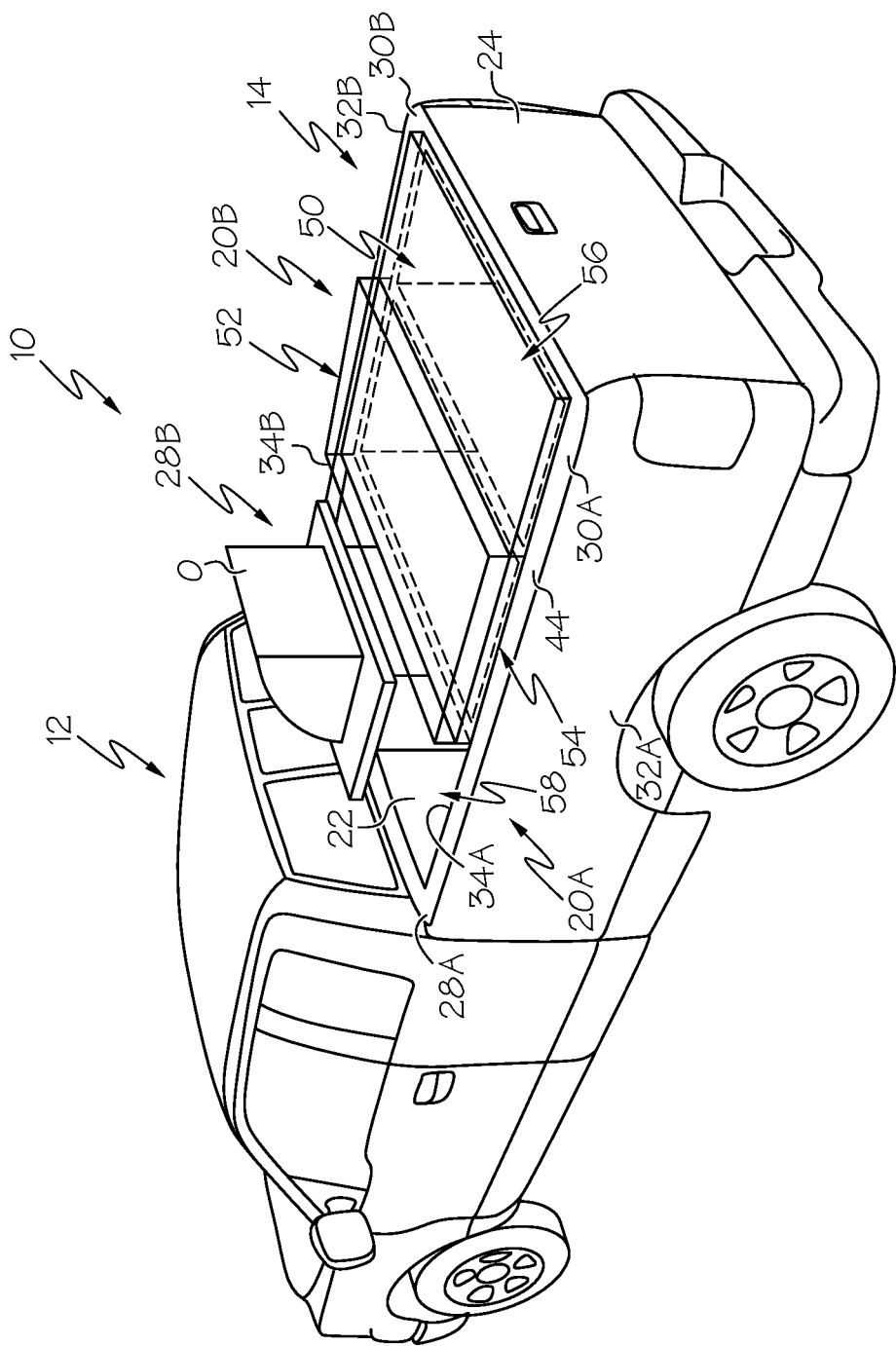
FIG. 2 schematically depicts a perspective view of the pickup truck of FIG. 1, according to one or more embodiments shown and described herein.

Referring also to FIG. 2, the sidewalls 20A, 20B include an exterior wall panel 32A, 32B and an opposite interior wall panel 34A, 34B. The sidewalls 20A, 20B include upper ends 44 and opposite lower ends 46 (FIG. 1). The lower ends 46 are positioned closer to the floor 18 of the truck bed 14 than the upper ends 44. The sidewalls 20A and 20B may include a sidewall cover that is used to cover the upper ends 44.

A truck bed cover 50 is releasably connected to the sidewalls 20A and 20B and extends over the truck bed 14. The truck bed cover 50 includes multiple panel assemblies 52, 54 and 56 that are hingedly attached to one another by hinges 60 (FIG. 1) to allow for folding and unfolding of one panel assembly relative to an adjacent panel assembly. In the embodiment of FIGS. 1 and 2, the panel assembly 52 is shown folded over the panel assembly 54 to provide an uncovered region 58 adjacent the passenger cabin 12. An object O is located in the uncovered region 58 that extends upwardly beyond the truck bed cover 50. Providing the uncovered region 58 allows for space to place the object O in the truck bed 14 while covering a portion of the truck bed adjacent the uncovered region 58 that extends from the uncovered region 58 to the tailgate 24.

Referring particularly to FIG. 1, the panel assembly 54 includes a cover panel 62 and a compartment panel 64. The compartment panel 64 may be hingedly connected to the cover panel 62 by a hinge 75 to allow for pivoting movement of the compartment panel 64 relative to the cover panel 62 from a cover configuration placed against an underside 66 of the cover panel 62 and a compartment configuration where a free edge 68 is placed against the floor 18. In some embodiments, one or more seals, represented by element 70 may be provided around the edges of the compartment panel 64 to seal against one or more of the floor 18 and/sidewalls 20A and 20B to inhibit moisture from leaking thereby. A latch 72 or other locking mechanism may be provided to latch the compartment panel 64 in the cover configuration.

The panel assembly 56 includes a cover panel 74 and a compartment panel 76. The compartment panel 76 may be hingedly connected to the cover panel 74 by a hinge 78 to allow for pivoting movement of the compartment panel 76 relative to the cover panel 74 from a cover configuration placed against an underside 80 of the cover panel 74 and a compartment configuration where a free edge 82 is placed against the floor 18. In some embodiments, one or more seals, represented by element 84 may be provided around the edges of the compartment panel 76 to seal against one or more of the floor 18 and/sidewalls 20A and 20B to inhibit moisture from leaking thereby. A latch 86 or other locking mechanism may be provided to latch the compartment panel 76 in the cover configuration.

During operation, the panel assembly 52 may be unlatched from the sidewalls 20A and 20B and then pivoted rearward over the panel assembly 54. A latch may be provided so that the panel assembly 52 and panel assembly 54 interlock to inhibit unintended movement of the panel assembly 52 relative to the panel assembly 54. The compartment panel 64 may then be unlatched from the cover panel 62 and then pivoted from the cover configuration to the compartment configuration where the free edge 68 engages the floor 18. In some embodiments, the compartment panel 64 may lock in the compartment configuration to inhibit unintended movement of the compartment panel 64. Similarly, the compartment panel 76 may then be unlatched from the cover panel 74 and then pivoted from the cover configuration to the compartment configuration where the free edge 82 engages the floor 18. In some embodiments, the compartment panel 76 may lock in the compartment configuration to inhibit unintended movement of the compartment panel 76. As can be appreciated, in the compartment configuration, the compartment panels 64 and 76 create part of a compartment that is enclosed by the compartment panels 64 and 76 and the sidewalls 20A and 20B.

Figure 3:
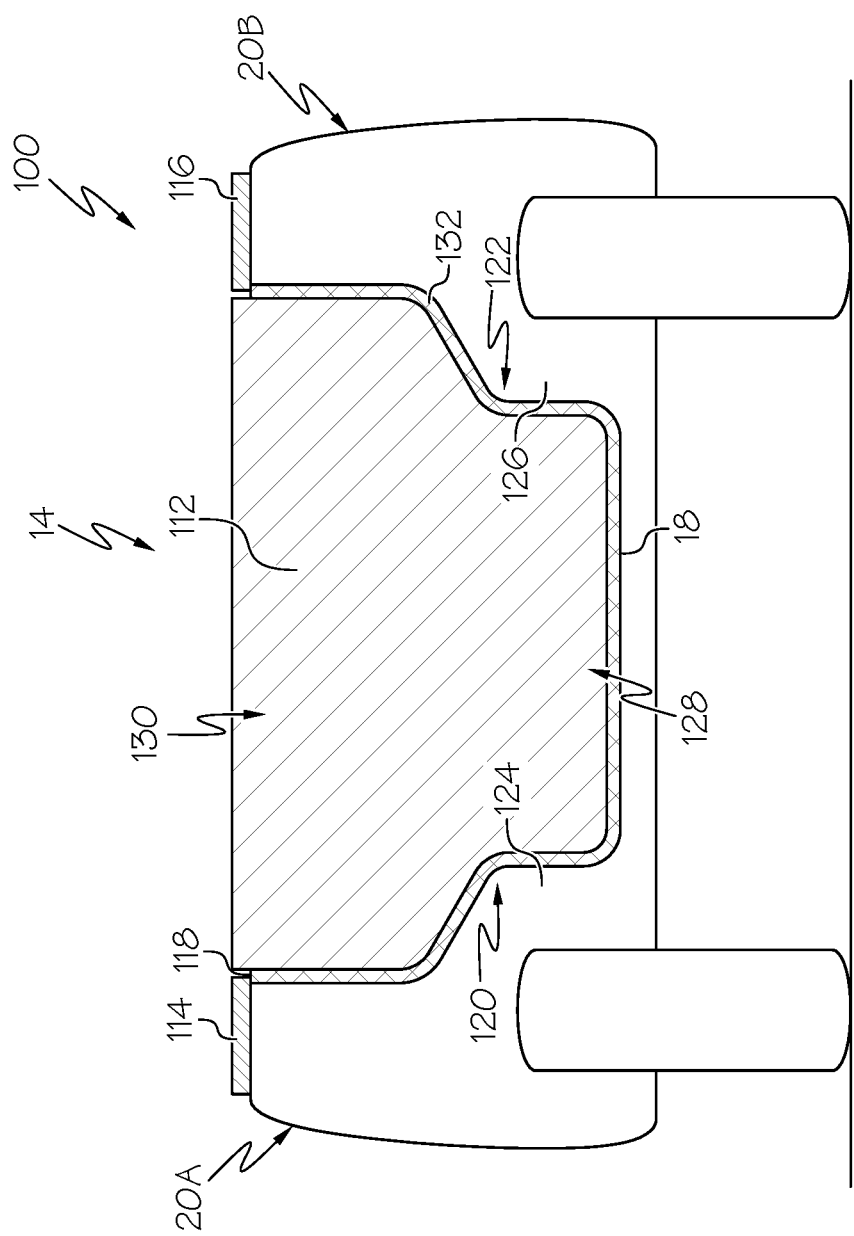
FIG. 3 schematically depicts a rear, partial view of another pickup truck with a truck bed cover, according to one or more embodiments shown and described herein.
Figure 4:
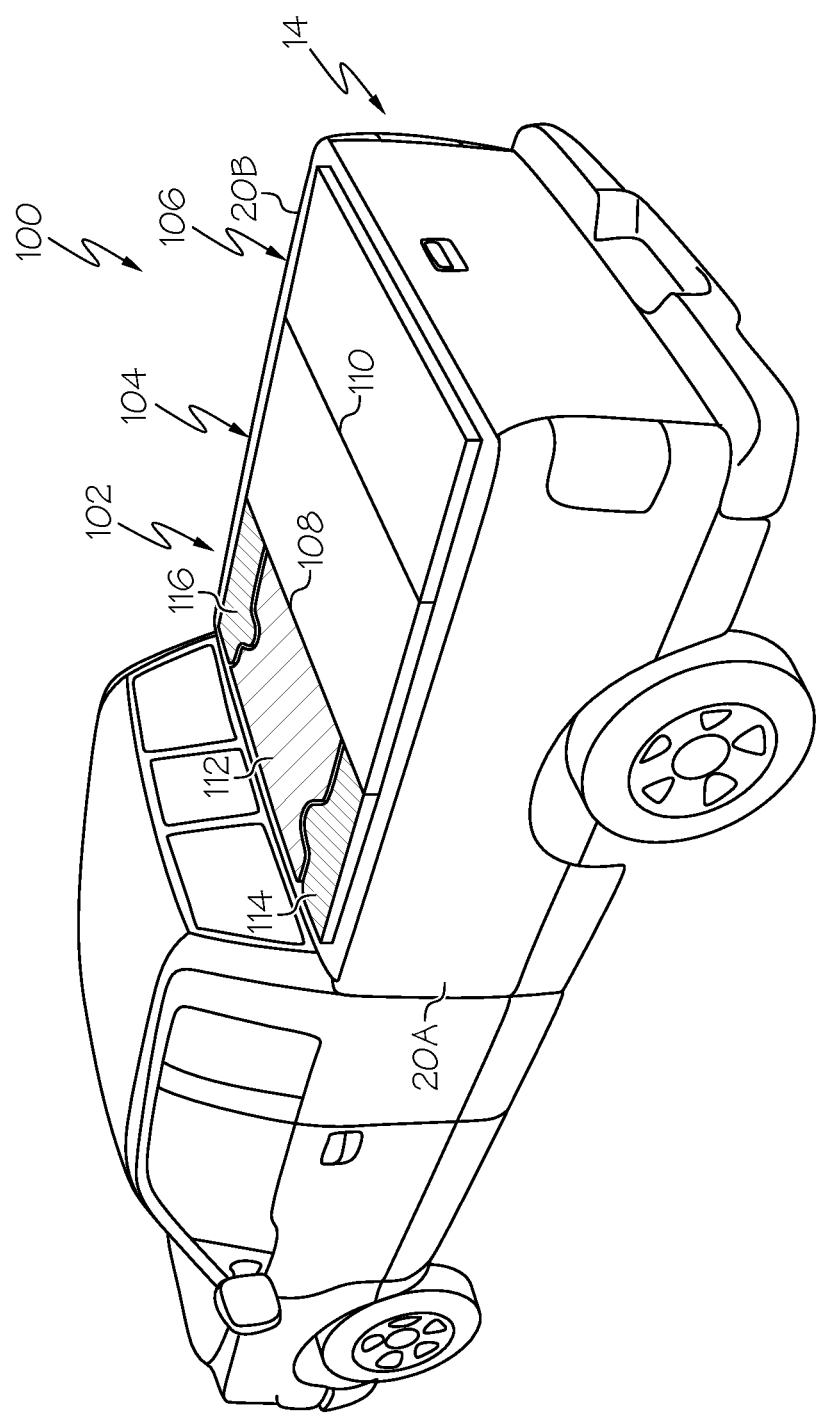
FIG. 4 schematically depicts a perspective view of the pickup truck of FIG. 3, according to one or more embodiments shown and described herein.

Referring now to FIGS. 3 and 4, another embodiment of a truck bed cover 100 uses a cover panel itself as both a cover panel with the cover panel is a cover configuration, and a compartment panel with the cover panel in a compartment configuration. The truck bed cover 100 is releasably connected to the sidewalls 20A and 20B and extends over the truck bed 14. The truck bed cover 100 includes multiple panel assemblies 102, 104 and 106 that are hingedly attached to one another by hinges (represented by lines 108 and 110) to allow for folding and unfolding of one panel assembly relative to an adjacent panel assembly. In the embodiment of FIG. 1, the panel assembly 102 is illustrated in the cover configuration providing a covered region adjacent the passenger cabin 12.

In this embodiment, the panel assembly 102 includes a cover panel 112 that is releasably attached to side panels 114 and 116. The side panels 114 and 116 are mounted directly to the side walls 20A and 20B such that they do not move unless released therefrom. The cover panel 112 may be pivotally connected to the side panels 114 and 116 and/the panel assembly 104 (e.g., by hinges or pins 118), such that the cover panel 112 can pivot from the cover configuration (FIG. 4) to the compartment configuration (FIG. 3). A latch may be provided to latch the cover panel 112 in both the cover configuration and the compartment configuration. The hatching of FIGS. 3 and 4 is provided to contrast the cover panel 112 and the side panels 114 and 116. Referring to FIG. 3, the cover panel 112 may be provided with recesses 120 and 122 that are shaped to accommodate rear wheel wells 124 and 126 located in the truck bed 14 (FIG. 3). As can be seen, with the recesses 120 and 122, the cover panel 112 includes a relatively narrow portion 128 of less width, and a relatively wide portion 130 of greater width. A seal 132 is shown extending about the cover panel 112 that can be used to seal the cover panel 112 against the floor 18 and sidewalls 20A and 20B.

The above-described truck bed covers include multiple panel assemblies and have a cover configuration and a compartment configuration. In the cover configuration, the entire truck bed may be covered to isolate the truck bed from the environment and provide security for contents within the truck bed. With the truck bed covers in a partially open configuration where an uncovered region is provided, the truck bed covers have a compartment configuration where an enclosed compartment is provided below the truck bed covers in order to isolate the compartment from the environment and provide security for contents within the compartment.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A truck bed cover for a pickup truck, the truck bed cover comprising:
   a first panel assembly; and
   a second panel assembly that is pivotally connected to the first panel assembly at a first pivot location such that the second panel assembly pivots relative to the first panel assembly between a closed configuration and an open configuration providing an uncovered region adjacent the first panel assembly;
   wherein the first panel assembly comprises a compartment panel that is pivotally connected to a cover panel at a second pivot location different from the first pivot location and adjacent to the second panel assembly, the compartment panel having a cover configuration where the compartment panel is pivoted to cover a part of a truck bed and a compartment configuration where the compartment panel is pivoted to form part of a compartment beneath the cover panel.

2. The truck bed cover of claim 1 further comprising a third panel assembly that is pivotally connected to the first panel assembly such that the third panel assembly pivots relative to the first panel assembly between a closed configuration and an open configuration providing an uncovered region adjacent the first panel assembly.

3. The truck bed cover of claim 2, wherein the third panel assembly comprises another compartment panel having a cover configuration where the another compartment panel covers a part of a truck bed and a compartment configuration where the another compartment panel is pivoted to form part of the compartment beneath the truck bed cover.

4. The truck bed cover of claim 3, wherein the compartment panel of the first panel assembly and the another compartment panel of the third panel assembly are sized to engage both sidewalls of the truck bed in forming the compartment.

5. A pickup truck comprising:
   a passenger cabin;
   a truck bed located rearward of the passenger cabin in a vehicle longitudinal direction, the truck bed includes a floor and a pair of spaced apart sidewalls; and
   a truck bed cover connected to the sidewalls, the truck bed cover comprising:
      a first panel assembly; and
      a second panel assembly that is pivotally connected to the first panel assembly at a first pivot location such that the second panel assembly pivots relative to the first panel assembly between a closed configuration and an open configuration providing an uncovered region adjacent the first panel assembly;
      wherein the first panel assembly comprises a compartment panel that is pivotally connected to a cover panel at a second pivot location different from the first pivot location and adjacent to the second panel assembly, the compartment panel having a cover configuration where the compartment panel is pivoted to cover a part of the truck bed and a compartment configuration where the compartment panel is pivoted to form part of a compartment beneath the cover panel.

6. The pickup truck of claim 5, wherein the truck bed cover further comprises a third panel assembly that is pivotally connected to the first panel assembly such that the third panel assembly pivots relative to the first panel assembly between a closed configuration and an open configuration providing an uncovered region adjacent the first panel assembly.

7. The pickup truck of claim 6, wherein the third panel assembly comprises another compartment panel having a cover configuration where the another compartment panel covers a part of the truck bed and a compartment configuration where the compartment panel is provided to form part of the compartment beneath the truck bed cover.

8. The pickup truck of claim 7, wherein the compartment panel of the first panel assembly and the another compartment panel of the third panel assembly are sized to engage both sidewalls of the truck bed in forming the compartment.

* * * * *